United States Patent
Oh

(10) Patent No.: US 11,914,071 B2
(45) Date of Patent: Feb. 27, 2024

(54) RADAR APPARATUS FOR DETECTING TARGET OBJECT

(71) Applicant: SMART RADAR SYSTEM, INC., Seongnam-si (KR)

(72) Inventor: Kyung Sub Oh, Hwaseong-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 423 days.

(21) Appl. No.: 17/361,336

(22) Filed: Jun. 29, 2021

(65) Prior Publication Data
US 2022/0283268 A1    Sep. 8, 2022

(30) Foreign Application Priority Data
Mar. 4, 2021    (KR) .................. 10-2021-0028531

(51) Int. Cl.
| | |
|---|---|
| G01S 7/41 | (2006.01) |
| G01S 13/04 | (2006.01) |
| H01Q 1/32 | (2006.01) |
| H01Q 1/42 | (2006.01) |
| H01Q 21/00 | (2006.01) |

(52) U.S. Cl.
CPC ............... *G01S 7/41* (2013.01); *G01S 13/04* (2013.01); *H01Q 1/3233* (2013.01); *H01Q 1/42* (2013.01); *H01Q 21/0025* (2013.01)

(58) Field of Classification Search
CPC .. G01S 7/02; G01S 7/41; G01S 13/04; H01Q 1/3233; H01Q 1/42; H01Q 3/32; H01Q 13/206; H01Q 21/0025; H01Q 21/065; H01Q 21/0075; H01Q 21/0006; H01Q 21/08
See application file for complete search history.

(56) References Cited

U.S. PATENT DOCUMENTS

| | | | | | |
|---|---|---|---|---|---|
| 5,210,541 | A | * | 5/1993 | Hall ...................... | H01Q 25/00 343/731 |
| 5,414,434 | A | * | 5/1995 | Conant ................ | H01Q 9/0457 343/846 |
| 6,429,805 | B1 | * | 8/2002 | Cornic .................... | G01S 7/352 342/21 |
| 8,912,960 | B1 | * | 12/2014 | Andrenko ................ | H01Q 1/38 343/895 |
| 10,025,960 | B1 | * | 7/2018 | Fink ......................... | H04L 5/08 |

(Continued)

FOREIGN PATENT DOCUMENTS

| | | |
|---|---|---|
| JP | 04-120804 A | 4/1992 |
| JP | 02-206729 A | 8/1993 |

(Continued)

OTHER PUBLICATIONS

European Search Report dated Dec. 17, 2021 from the European Patent Office for European Application No. 21181468.6.

(Continued)

*Primary Examiner* — Peter M Bythrow
(74) *Attorney, Agent, or Firm* — Insight Law Group, PLLC; Seung Lee

(57) ABSTRACT

A radar apparatus for detecting a target object is provided, which can improve target object detection performance by improving a Field of View (FOV) and can be widely used in various fields such as robotics and Internet of Things (IoTs) devices, as well as autonomous vehicles.

7 Claims, 10 Drawing Sheets

(56) References Cited

U.S. PATENT DOCUMENTS

| | | | |
|---|---|---|---|
| 10,777,878 B2* | 9/2020 | Kim | H01Q 1/3233 |
| 11,539,139 B1* | 12/2022 | Cheng | H01Q 21/0037 |
| 2012/0026053 A1* | 2/2012 | Focke | H01Q 21/005 |
| | | | 343/771 |
| 2012/0169525 A1* | 7/2012 | Klar | H01Q 21/0037 |
| | | | 342/70 |
| 2014/0054383 A1* | 2/2014 | Andrenko | H01Q 1/2216 |
| | | | 235/492 |
| 2014/0218259 A1* | 8/2014 | Lee | H01Q 1/3233 |
| | | | 343/852 |
| 2015/0200461 A1* | 7/2015 | Matsumura | H01Q 9/0407 |
| | | | 343/843 |
| 2018/0115059 A1* | 4/2018 | Tokunaga | G01S 7/032 |
| 2021/0280970 A1* | 9/2021 | Ueda | H01Q 21/065 |
| 2022/0123460 A1* | 4/2022 | Sakurai | H01Q 1/52 |
| 2022/0344806 A1* | 10/2022 | Cho | H01Q 1/48 |

FOREIGN PATENT DOCUMENTS

| | | |
|---|---|---|
| JP | 07-086826 A | 3/1995 |
| JP | 11-266118 A | 9/1999 |
| JP | 2011-055419 A | 3/2011 |
| JP | 2018-071984 A | 5/2018 |
| JP | 2020-200008 A | 12/2020 |
| JP | 2021-010060 A | 1/2021 |
| KR | 10-2017-0061426 A | 6/2017 |
| WO | 2006/103128 A1 | 10/2006 |

OTHER PUBLICATIONS

Japanese office action dated May 31, 2022 for Japanese Application No. 2021-111513.

* cited by examiner

Frequency = 79GHz
Main lobe magnitude = 12.1 dBi
Main lobe direction = 0.0 deg.
Angular width (3 dB) = 43.4 deg.
Side lobe level = -27.3 dB (a)

Frequency = 79GHz
Main lobe magnitude = 12.1 dBi
Main lobe direction = 0.7 deg.
Angular width (3 dB) = 40.9 deg.
Side lobe level = -11.6 dB (b)

RADAR APPARATUS FOR DETECTING TARGET OBJECT

CROSS-REFERENCE TO RELATED APPLICATION(S)

This application claims priority from Korean Patent Application No. 10-2021-0028531, filed on Mar. 4, 2021, in the Korean Intellectual Property Office, the disclosure of which is incorporated herein by reference in its entirety.

BACKGROUND

1. Field

The following description relates to a technology for detecting a target object, and more particularly, to a radar apparatus for detecting a target object.

2. Description of Related Art

A technology that detects a target object using a camera has vulnerability in that detection performance is degraded due to backlight or rain. The vulnerability of the technology to detect the target object using the camera can be solved through radar technology.

FIG. 1 is a diagram illustrating an antenna of a radar apparatus for detecting a target object of the related art. In the case of the radar apparatus for detecting a target object of the related art illustrated in FIG. 1, a feeding line connecting antenna patches has a half wavelength with an effective dielectric constant of a microstrip line, and a beam width of a radiated beam is determined by a spacing between centers of the patches. In the case of a printed circuit board (PCB) with a low specific permittivity, a distance between centers of an antenna is a wavelength in the air and greater than a half wavelength.

FIG. 2 is a diagram illustrating a three-dimensional (3D) beam pattern of the radar apparatus for detecting a target object of the related art, FIG. 3 illustrates diagrams illustrating a one-dimensional (1D) beam pattern of the radar apparatus for detecting a target object of the related art, FIG. 3A illustrates the 1D beam pattern in an azimuth direction, and FIG. 3B illustrates the 1D beam pattern in an elevation direction.

As illustrated in FIGS. 2 and 3, the radar apparatus for detecting a target object of the related art has a sharp (severe inclination) beam pattern based on a center of a to main lobe, and thus, it can be seen that a field of view (FOV) is narrow.

A radar apparatus for detecting a target object used in drones, autonomous vehicles, and the like should have an excellent FOV. Accordingly, the present inventors have studied a technology for improving the FOV of a radar apparatus for detecting a target object used in drones, autonomous vehicles, and the like.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a radar apparatus for detecting a target object with improved a field of view (FOV) to obtain excellent target object detection performance.

In one general aspect, there is provided a radar apparatus for detecting a target object including an antenna having antenna patches and a feeding line connecting the antenna patches, and a control module controlled to transmit or receive a radar signal through the antenna and configured to detect a target object by analyzing the transmitted and received radar signal, wherein in the feeding line, a bent portion is formed so that a length of the feeding line is a half wavelength of a transmission/reception wavelength as an effective dielectric constant of a microstrip line while a spacing between the antenna patches is less than the half wavelength of the transmission/reception wavelength as a wavelength in air to expand a Field of View (FOV).

The radar apparatus for detecting a target object may further include a radome configured to protect the antenna and, at the same time, additionally expand the FOV.

The radome may be implemented to have a thickness less than a multiple of the half wavelength of the transmission/reception wavelength so that a target object detection area is aligned with a FOV section.

Radiating components may have the same phase while a radar signal is multiply-reflected inside the radome having a thickness that approximates the multiple of the half wavelength of the transmission/reception wavelength, and maximum radiation may be realized.

The antenna may be provided as a plurality of antennas.

The plurality of antennas may be distributed by a divider line to form a branch structure.

The divider line may be connected to the control module.

Other features and aspects will be apparent from the following detailed description, the drawings, and the claims.

Figure 1:
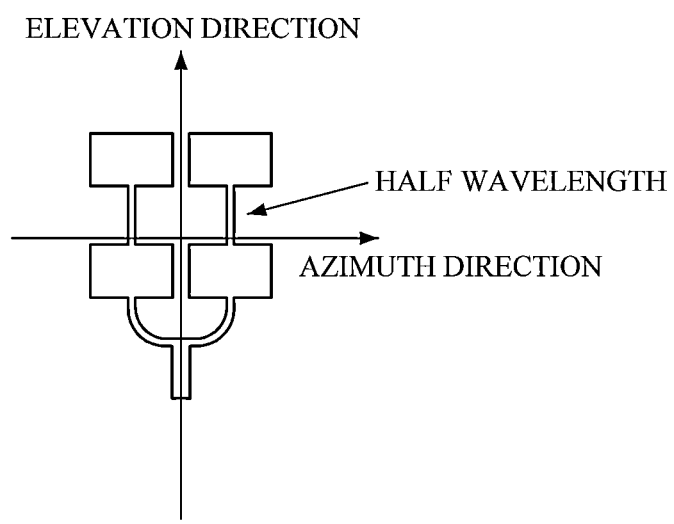
FIG. 1 is a diagram illustrating an antenna of a radar apparatus for detecting a target object of the related art.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, the present invention will be described in detail so that those skilled in the art can easily understand and reproduce the present invention through exemplary embodiments described with reference to the accompanying drawings. Although specific embodiments are illustrated in the drawings and related detailed descriptions are described, this is not intended to limit the various embodiments of the present invention to a specific form.

In describing the present invention, when it is determined that a detailed description of a related known function or configuration may unnecessarily obscure the subject matter of the embodiments of the present invention, a detailed description thereof will be omitted.

When a component is referred to as being "connected" or "coupled" to another component, it is understood that it may be directly connected or coupled to another component, but still another components may exist therebetween.

Meanwhile, when a component is referred to as being "directly connected" or "directly coupled" to another component, it should be understood that there is no other component therebetween.

Figure 4:
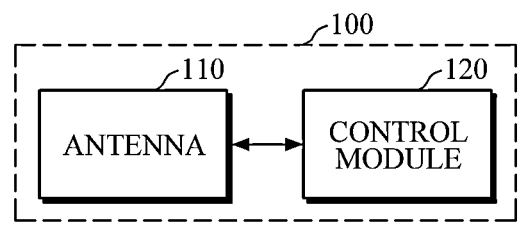
FIG. 4 is a block diagram illustrating a configuration of one embodiment of a radar apparatus for detecting a target object according to the present invention.
Figure 5:
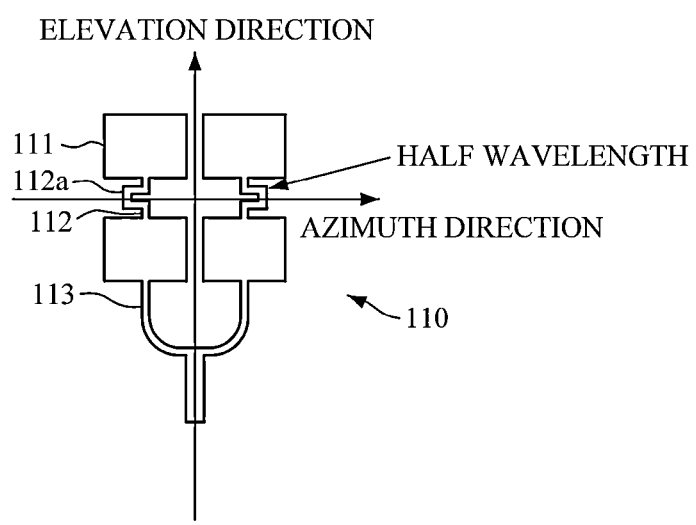
FIG. 5 is a diagram illustrating a configuration of one embodiment of an antenna of the radar apparatus for detecting a target object according to the present invention.

FIG. 4 is a block diagram illustrating a configuration of one embodiment of a radar apparatus for detecting a target object according to the present invention, and FIG. 5 is a diagram illustrating a configuration of one embodiment of an antenna of the radar apparatus for detecting a target object according to the present invention. As illustrated in the drawings, a radar apparatus 100 for detecting a target object according to this embodiment includes an antenna 110 and a control module 120.

The antenna 110 includes antenna patches 111 and feeding lines 112 connecting the antenna patches. In this case, the feeding line 112 has a bent portion 112a formed so that a length of the feeding line 112 is a half wavelength of a transmission/reception wavelength as a microstrip line while a spacing between the antenna patches 111 is less than the half wavelength of the transmission/reception wavelength as a wavelength in air, and thus, is implemented to expand a Field of View (FOV).

When the bent portion 112a is formed in the feeding line 112, the spacing between the antenna patches 111 is reduced to be less than the half wavelength of a transmission/reception wavelength of a radar signal while the length of the feeding line 112 is maintained to be the half wavelength of the transmission/reception wavelength of the radar signal, a signal loss occurs slightly at a center portion of a beam pattern. However, a signal is strengthened in the periphery and a concentration of the beam pattern is weakened and distributed evenly. Therefore, the FOV expands, and the length of the antenna is reduced, which is advantageous for device miniaturization.

Meanwhile, the antenna 110 may be provided as a plurality of antennas 110, and the plurality of antennas 110 may be distributed by divider lines 113 to form a branch structure. In this case, the divider line 113 is connected to the control module 120, and a radius of the FOV is determined by the number of antennas 110 and the number of antenna patches 111 included in each antenna 110.

Figure 6:
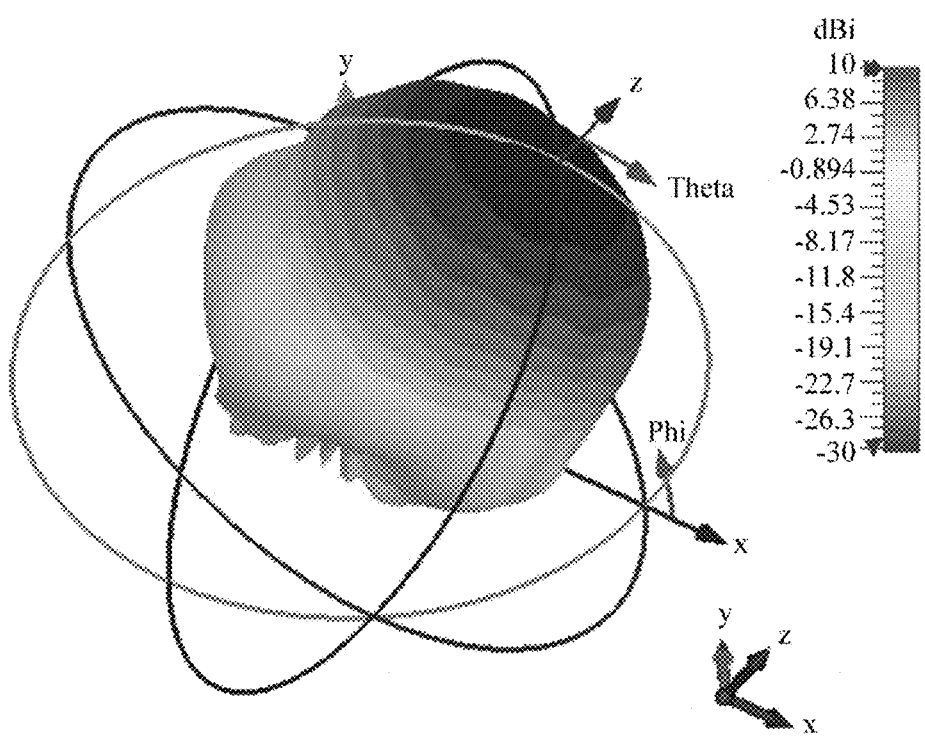
FIG. 6 is a diagram illustrating a 3D beam pattern of the radar apparatus for detecting a target object according to the present invention.
Figure 7:
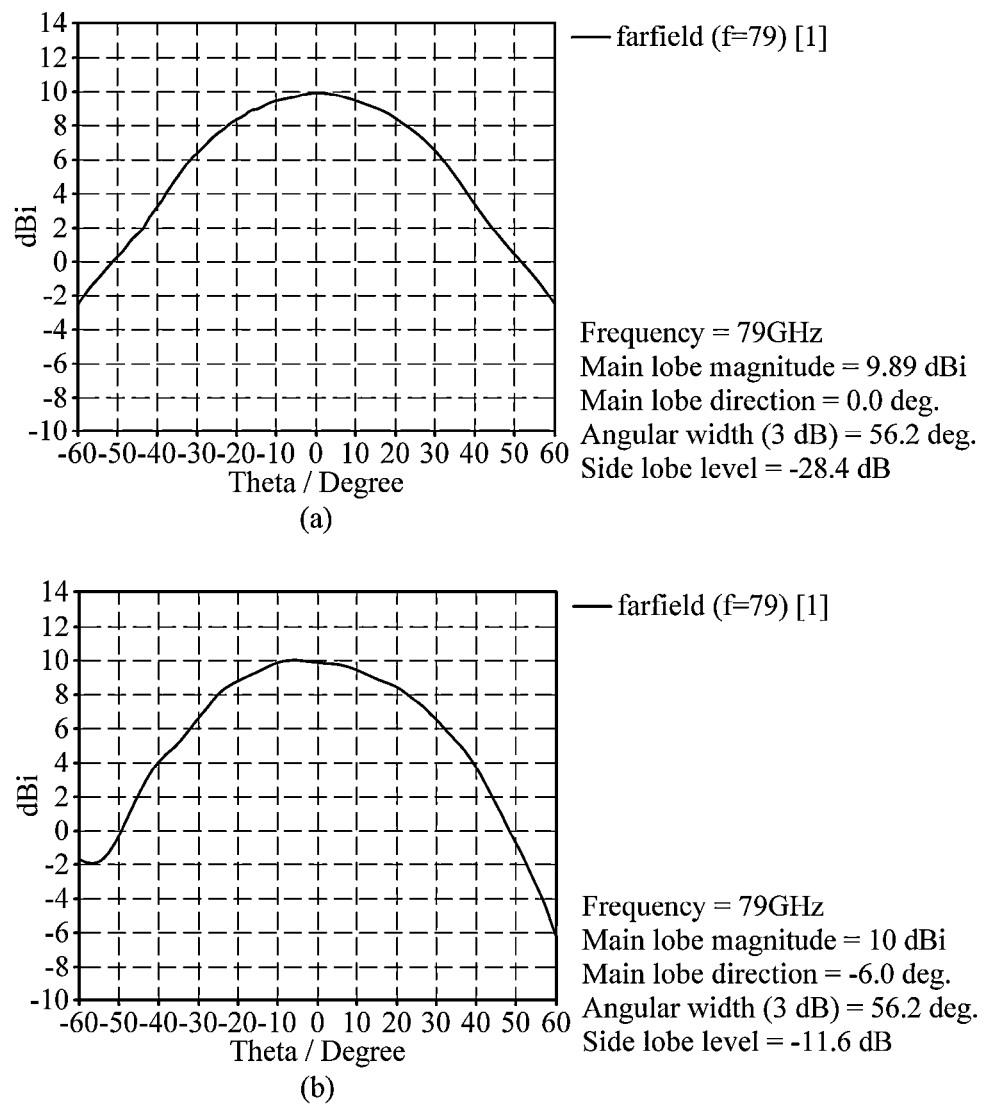
FIG. 7 illustrates diagrams illustrating a 1D beam pattern of the radar apparatus for detecting a target object according to the present invention.

FIG. 6 is a diagram illustrating a three-dimensional (3D) beam pattern of the radar apparatus for detecting a target object according to the present invention, FIG. 7 illustrates diagrams illustrating a one-dimensional (1D) beam pattern of the radar apparatus for detecting a target object according to the present invention, FIG. 7A illustrates the 1D beam pattern in an azimuth direction, and FIG. 7B illustrates the 1D beam pattern in an elevation direction.

Figure 2:
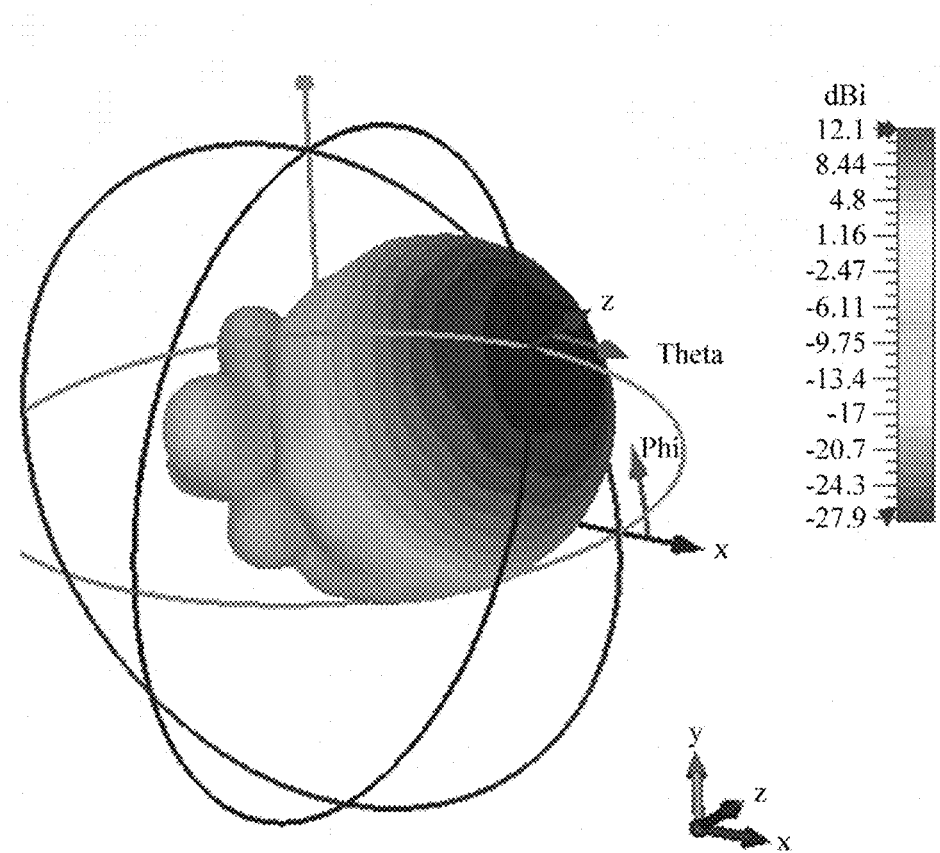
FIG. 2 is a diagram illustrating a three-dimensional (3D) beam pattern of the radar apparatus for detecting a target object of the related art.
Figure 3:
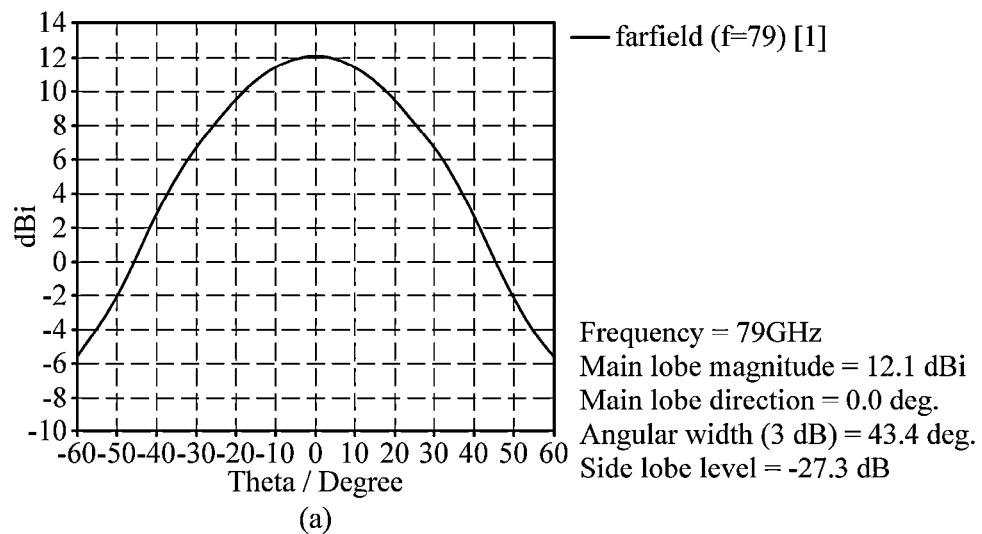
FIG. 3 illustrates diagrams illustrating a one-dimensional (1D) beam pattern of the radar apparatus for detecting a target object of the related art.
Figure 3:
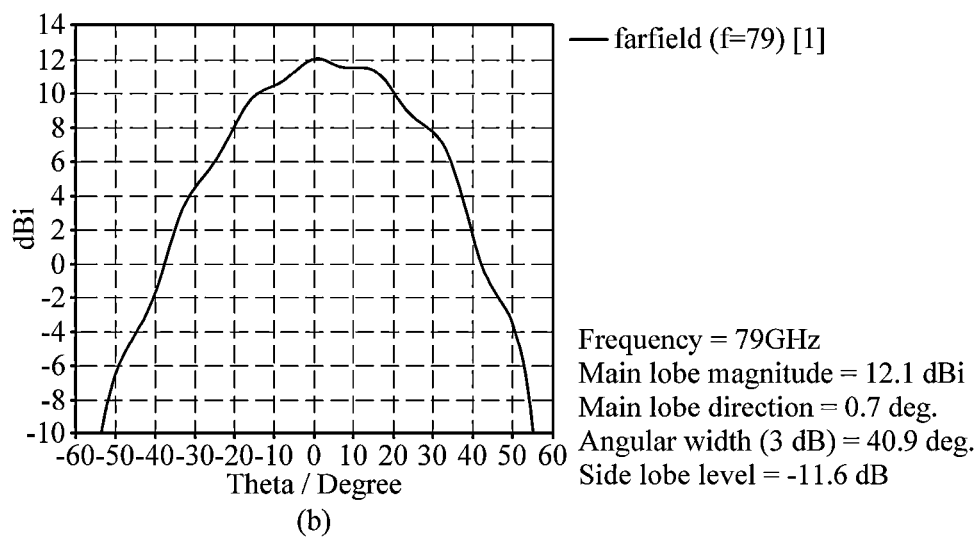

As illustrated in FIGS. 6 and 7, compared with the radar apparatus for detecting a target object of the related art illustrated in FIGS. 2 and 3, in the radar apparatus for detecting a target object according to the present invention, a relatively flat (gentler slope) beam pattern is illustrated based on a center of a main lobe, the beam pattern is evenly distributed around the center, and thus, it can be seen that a wide FOV is formed wider than that in the related art.

The control module 120 is controlled to transmit and receive the radar signal through the antenna and detects a target object by analyzing the transmitted and received radar signal. A configuration of the control module 120 that transmits and receives the radar signal and detects the target object by analyzing the radar signal is a matter already known in various ways before this application, and thus, a detailed description thereof will be omitted.

By implementing the present invention in this way, it is possible to improve the target object detection performance by improving the FOV, and thus, it is possible to provide a radar apparatus for target object detection with excellent quality that can be widely used in various fields such as robotics and Internet of Things (IoT) devices, as well as autonomous vehicles.

Meanwhile, according to an additional aspect of the present invention, the radar apparatus 100 for detecting a target object may further include a radome 130. The radome 130 protects the antenna 110 and additionally expands the FOV.

In this case, the radome 130 may be implemented to have a thickness less than a multiple of the half wavelength of the transmission/reception wavelength so that a target object detection area is aligned with a FOV section. For example, when the thickness of the radome 130 is implemented to be less than a multiple of the half wavelength of the transmission/reception wavelength and approximate to the multiple of the half wavelength of the transmission/reception wavelength, radiating components have the same phase while a radar signal is multiply-reflected inside the radome, and thus, maximum radiation is realized.

In the case of radiating a radar signal having a frequency of less than or equal to a gigahertz (GHz) band, the thickness of the radome may be implemented to be as thin as possible compared to a minimum thickness that can protect the antenna, that is, the transmission/reception wavelength of the radar signal, and thus, effects of the radome can be minimized.

However, in the case of radiating a radar signal having a frequency of a millimeter (mm) band, the thickness of the radome should be 1 mm or less in order to implement a radome having the thickness that can neglect the effects of the radome. However, when the thickness of the radome is 1 mm or less, it is not possible to protect the antenna.

Accordingly, in the present invention, the thickness of the radome is implemented to be less than the multiple of the half wavelength of the transmission/reception wavelength and approximate to the multiple of the half wavelength of the transmission/reception wavelength, radiating components have the same phase while the radar signal is multiply-reflected inside the radome, and thus, the maximum radiation is realized. Therefore, even when the radar signal having a frequency of the mm band is radiated, it is possible to additionally expand the FOV while protecting the is antenna 110 through the radome 130.

Figure 8:
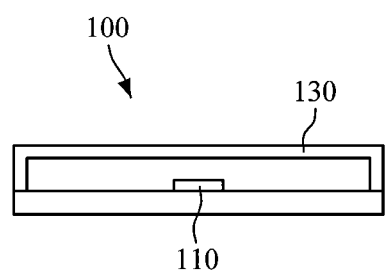
FIG. 8 is a diagram illustrating an implementation of a radome in the radar apparatus for detecting a target object according to the present invention.

FIG. 8 is a diagram illustrating an implementation of the radome in the radar apparatus for detecting a target object according to the present invention, in which the radome 130 having the thickness less than the multiple of the half wavelength of the transmission/reception wavelength is implemented in front of the antenna 110 to protect the antenna 110.

Figure 9:
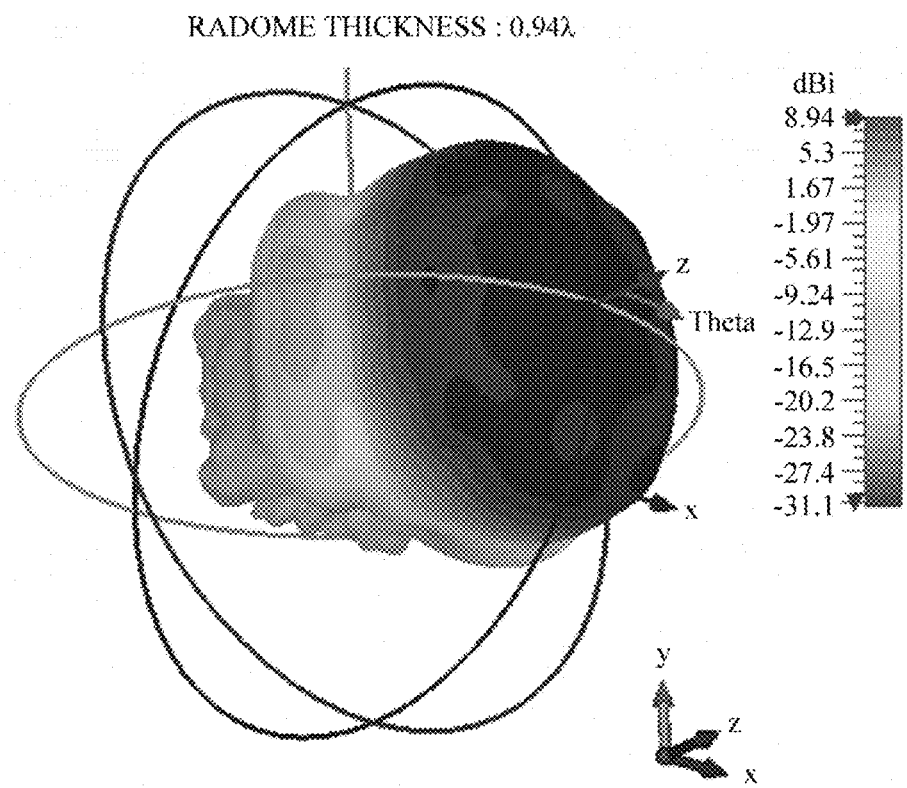
FIG. 9 is a diagram illustrating a 3D beam pattern when the radome is implemented in the radar apparatus for detecting a target object according to the present invention.
Figure 10:
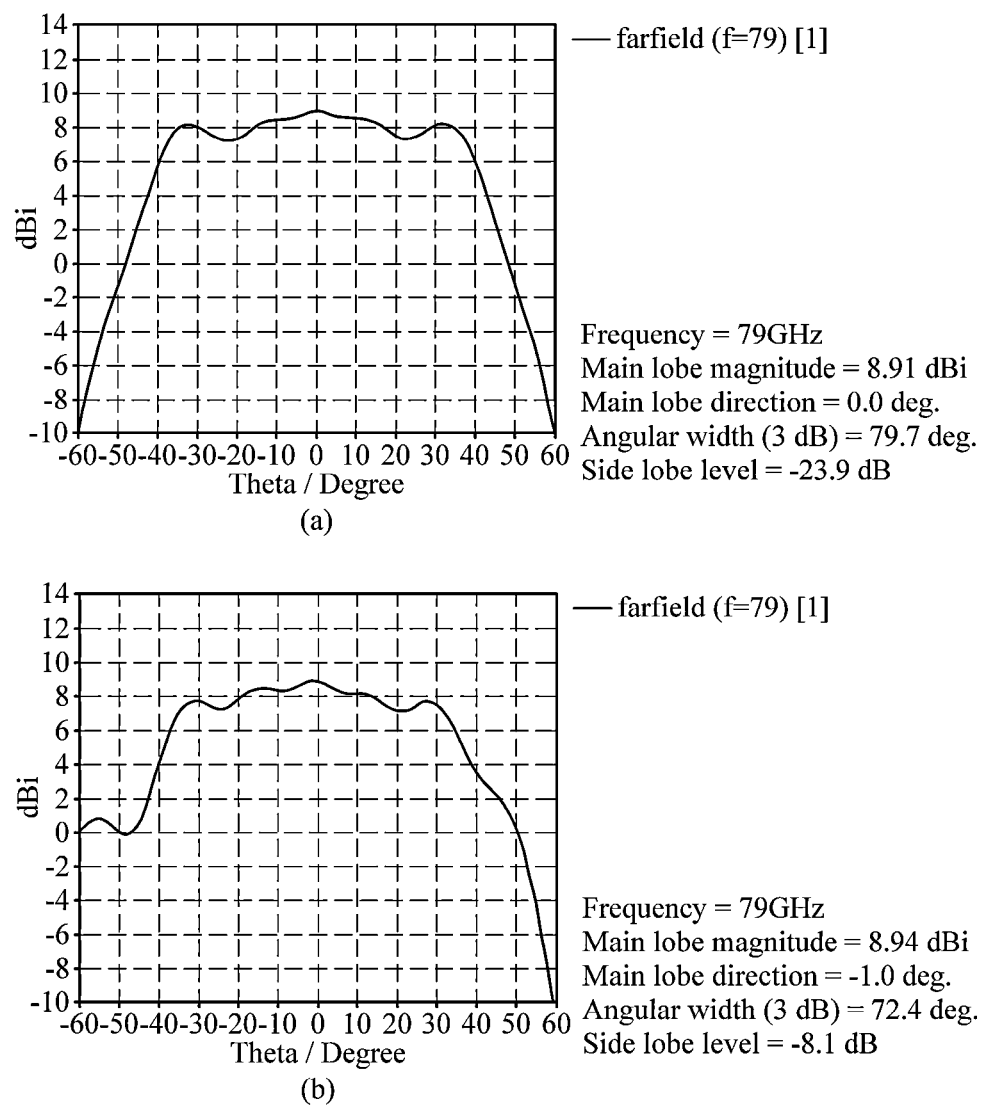
FIG. 10 illustrates diagrams illustrating a 1D beam pattern when the radome is implemented in the radar apparatus for detecting a target object according to the present invention.

Meanwhile, FIG. 9 is a diagram illustrating a 3D beam pattern when the radome is implemented in the radar apparatus for detecting a target object according to the present invention, FIG. 10 illustrates diagrams illustrating a 1D beam pattern when the radome is implemented in the radar apparatus for detecting a target object according to the present invention, FIG. 10A illustrates the 1D beam pattern in the azimuth direction, and FIG. 10B illustrates the 1D beam pattern in the elevation direction.

Referring to FIGS. 9 and 10, compared with the case illustrated in FIGS. 6 and 7 in which the radome is not implemented, when the radome is implemented to have the thickness less than the multiple of the half wavelength of the transmission/reception wavelength, a relatively flatter (gentler slope) beam pattern is illustrated based on a center of the main lobe, and thus, it can be seen that the FOV is further expanded.

According to the present invention, it is possible to improve the target object detection performance by improving the FOV, and thus, it is possible to provide the radar apparatus for target object detection with excellent quality that can be widely used in various fields such as robotics, IoTs, as well as autonomous vehicles.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A radar apparatus for detecting a target object, comprising:
   an antenna having antenna patches and a feeding line connecting the antenna patches; and
   a control module controlled to transmit or receive a radar signal through the antenna and configured to detect a target object by analyzing the transmitted and received radar signal,
   wherein in the feeding line, a bent portion is formed so that a length of the feeding line is a half wavelength of a transmission/reception wavelength while a spacing between the antenna patches is less than the half wavelength of the transmission/reception wavelength to expand a Field of View (FOV).

2. The radar apparatus for detecting a target object according to claim 1, further comprising a radome configured to protect the antenna and, at the same time, additionally expand the FOV.

3. The radar apparatus for detecting a target object according to claim 2, wherein the radome is implemented to have a thickness less than a multiple of the half wavelength of the transmission/reception wavelength so that a target object detection area is aligned with a FOV section.

4. The radar apparatus for detecting a target object according to claim 3, wherein radiating components have the same phase while a radar signal is multiply-reflected inside the radome having a thickness that approximates the multiple of the half wavelength of the transmission/reception wavelength, and maximum radiation is realized.

5. The radar apparatus for detecting a target object according to claim 1, wherein the antenna is provided as a plurality of antennas.

6. The radar apparatus for detecting a target object according to claim 5, wherein the plurality of antennas are distributed by a divider line to form a branch structure.

7. The radar apparatus for detecting a target object according to claim 6, wherein the divider line is connected to the control module.

* * * * *